United States Patent

[11] 3,598,924

[72] Inventor Daniel Zucker
Rishon Lezion, Israel

[21] Appl. No. 820,994
[22] Filed May 1, 1969
[45] Patented Aug. 10, 1971
[73] Assignee Telrad Telecommunication & Electronic Industries Limited
Lod, Israel
[32] Priority May 24, 1968
[33] Israel
[31] 30,070

[54] LINE HOLDING CIRCUIT FOR A MULTILINE TELEPHONE SYSTEM
1 Claim, 1 Drawing Fig.

[52] U.S. Cl. 179/99, 179/81
[51] Int. Cl. H04m 1/00
[50] Field of Search 179/99, 18.02, 81

[56] References Cited

UNITED STATES PATENTS 3,420,963 1/1969 Abbott et al. 179/99

OTHER REFERENCES

General Electric SCR Manual. 3rd Edition, 1964, pp. 78–81.

*Primary Examiner*—Kathleen H. Claffy
*Assistant Examiner*—Jan S. Black
*Attorney*—Arthur B. Colvin

ABSTRACT: The invention relates to a line holder circuit for a multiline telephone system which allows for the line to be held when the user, by actuating the line extension contacts, wishes to establish communication with an associated extension.

PATENTED AUG 10 1971 3,598,924

Figure 1:
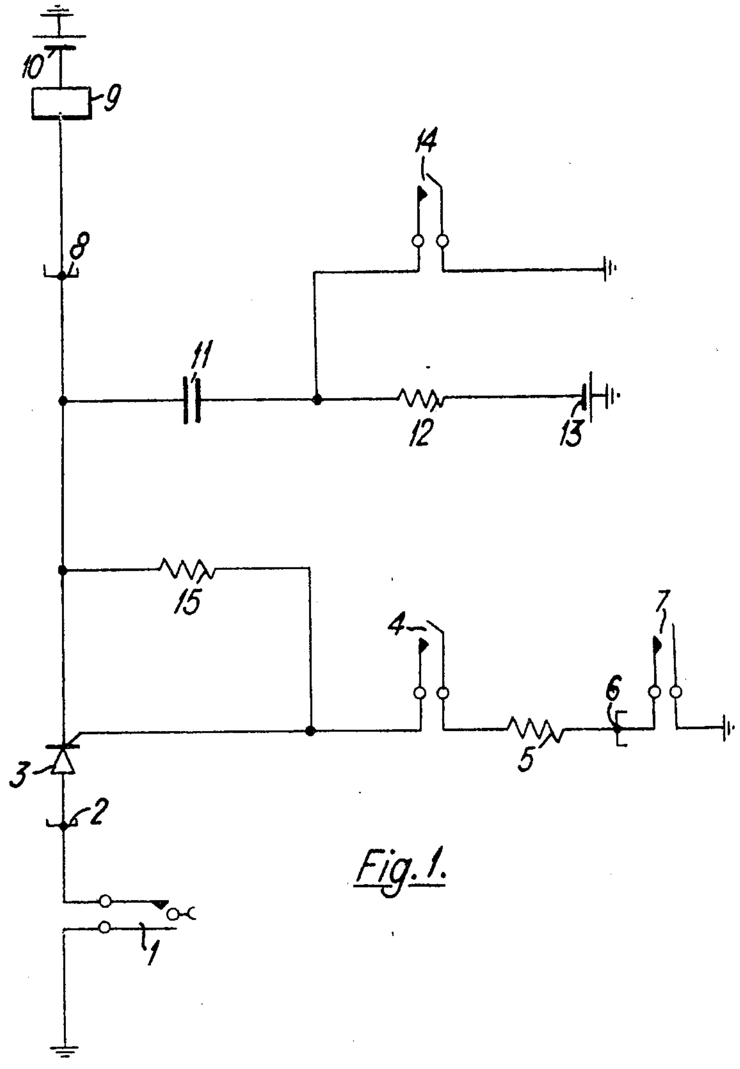

Inventor
DANIEL ZUCKER
By Arthur B Colvin
Attorney

LINE HOLDING CIRCUIT FOR A MULTILINE TELEPHONE SYSTEM

This invention relates to a line holding circuit for a multiline telephone system.

According to the present invention there is provided a line holding circuit for a multiline telephone system comprising a silicon controlled rectifier connected in series, on the one hand with a telephone handset cradle switch and a current supply for a holding relay and on the other hand with one plate of each of a plurality of capacitors, the other plate of each of the capacitors being connected in series with a current supply circuit, the gate electrode of the silicon controlled rectifier being connected in a triggering circuit via line and holding contacts.

One arrangement of a line holding circuit in accordance with the present invention will now be described by way of example and with reference to the accompanying circuit diagram.

The telephone instruments (not shown) are each provided with a cradle switch (only one shown) which is connected between earth and a junction 2 common to all the instruments. The junction 2 is connected to the anode of a silicon controlled rectifier 3, the gate electrode of which is connected via line extension contacts 4, resistor 5, a junction 6, common to all telephone instruments and call-holding contacts 7 to earth. The cathode of the silicon controlled rectifier 3 is connected to a junction 8 common to all the instruments, this junction 8 being connected on the one hand to a call-holding relay 9, said relay being connected via a current supply 10 to earth. The junction 8 is connected to a capacitor 11 which is connected on the one hand via a resistor 12 and a current supply 13 to earth and on the other hand via the line extension contact 14 to earth. The cathode of the silicon controlled rectifier 3 is connected to the gate electrode thereof via a resistor 15.

In operation, the raising of the handset by the user and the depression of the line extension contacts 4 and 14 results in the closing of the cradle switch 1 as well as the contacts 4 and 14. If now, the call-holding contacts 7 are momentarily closed, an actuating potential is applied to the gate electrode of the silicon controlled rectifier 3 as a result of which the silicon controlled rectifier 3 is rendered conductive, current flow taking place from earth to the negative terminal of the current supply 10 via the cradle switch 1, junction 2, silicon controlled rectifier 3, junction 8 and the coil of the relay 9. The relay 9 is therefore actuated and remains actuated even though the holding contacts 7 are released. As a consequence of the actuation of the relay 9 the particular extension line is held.

If now, the telephone handset is replaced, thereby opening the cradle switch 1, flow of current through the silicon controlled rectifier is interrupted as a result of which the relay 9 is deactuated and the line is freed.

The relay 9 can also be deactuated and the line released when the extension contacts of another associated telephone instrument are closed. Thus, when the silicon controlled rectifier 3 is rendered conductive the flow of current therethrough results in the charging of the capacitor 11, the capacitor plate connected to the silicon controlled rectifier anode being rendered positive whilst the other plate being rendered negative. When the telephone contacts associated with another telephone instrument are closed, a positive pulse is transmitted to the junction 8 and this reverses the potential on the silicon controlled rectifier 3 as a result of which flow through the silicon controlled rectifier 3 ceases and the relay 9 is deactuated, releasing the line.

It can thus be seen that whilst the line can be held by the arrangement described above, when, for example, the user, by actuating the line extension contacts, wishes to establish communication with an associated extension, the line is automatically released upon one of two circumstances, namely, when the user replaces his telephone instrument, or, and more significantly, when the user, having transferred the call to an associated instrument, the associated instruments line extension contacts are closed.

I claim:

1. In a telephone instrument for use in a multiline telephone system, a plurality of like line holding memory circuits each circuit comprising a silicon controlled rectifier connected in series between a handset cradle switch of the instrument and a terminal adapted for connection on the one hand to a holding relay and on the other hand to corresponding terminals in other instruments of the system, a gating circuit coupled to the gate of the silicon controlled rectifier and comprising a line key contact connected to a hold key of the instrument and a capacitor, one plate of which is connected via a line key contact to earth and and through a resistance to a current supply source and the other plate of which is coupled to the cathode of said silicon controlled rectifier.